Patented Mar. 6, 1945

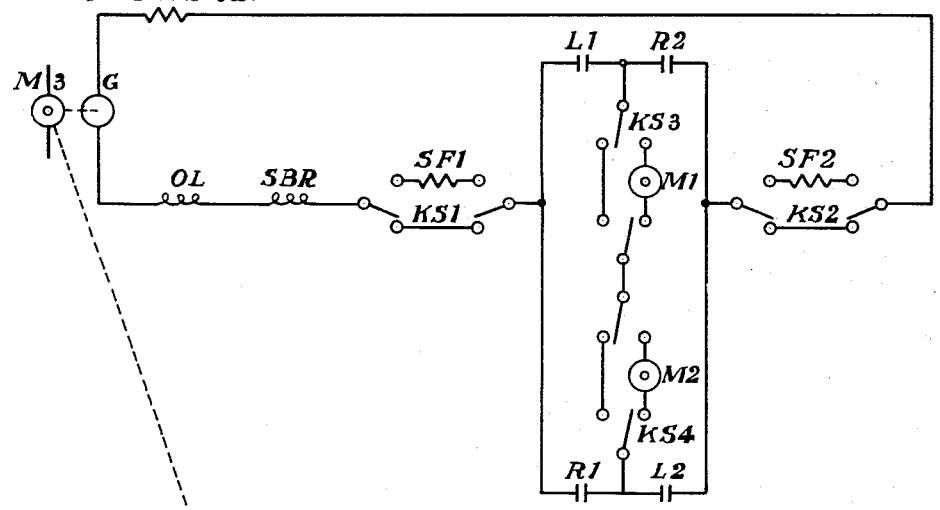
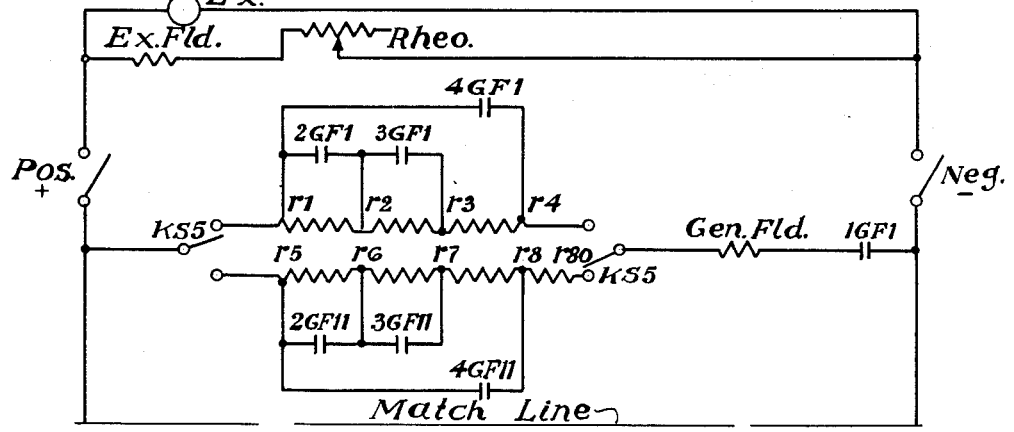
Fig. 2-A

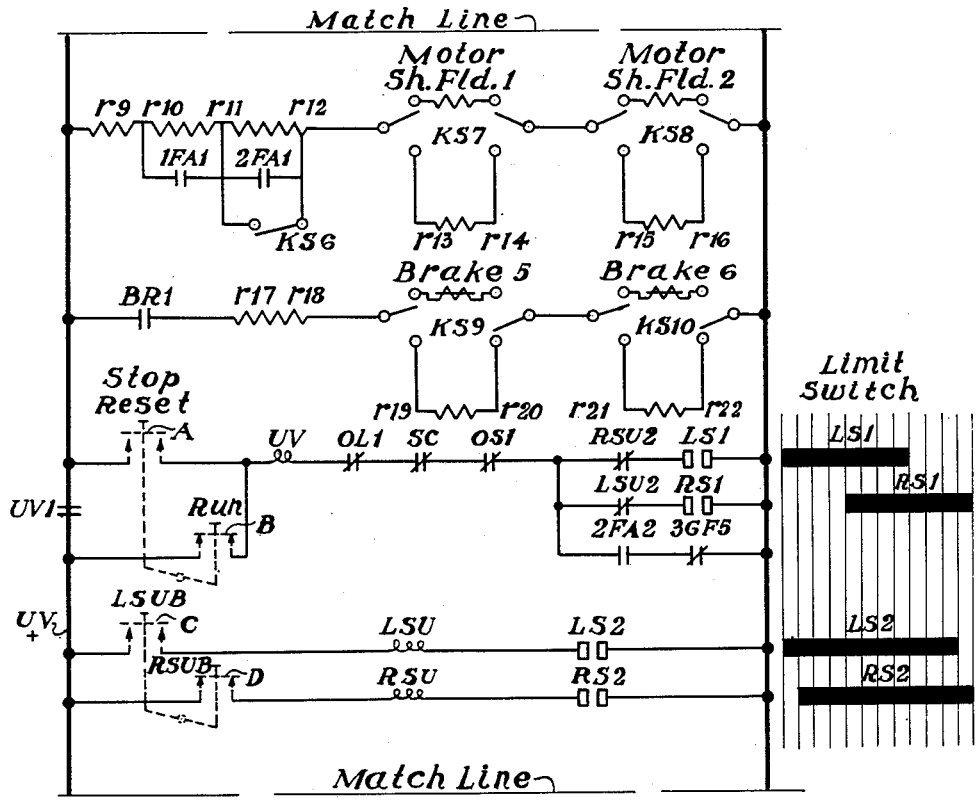
Fig. 2-B

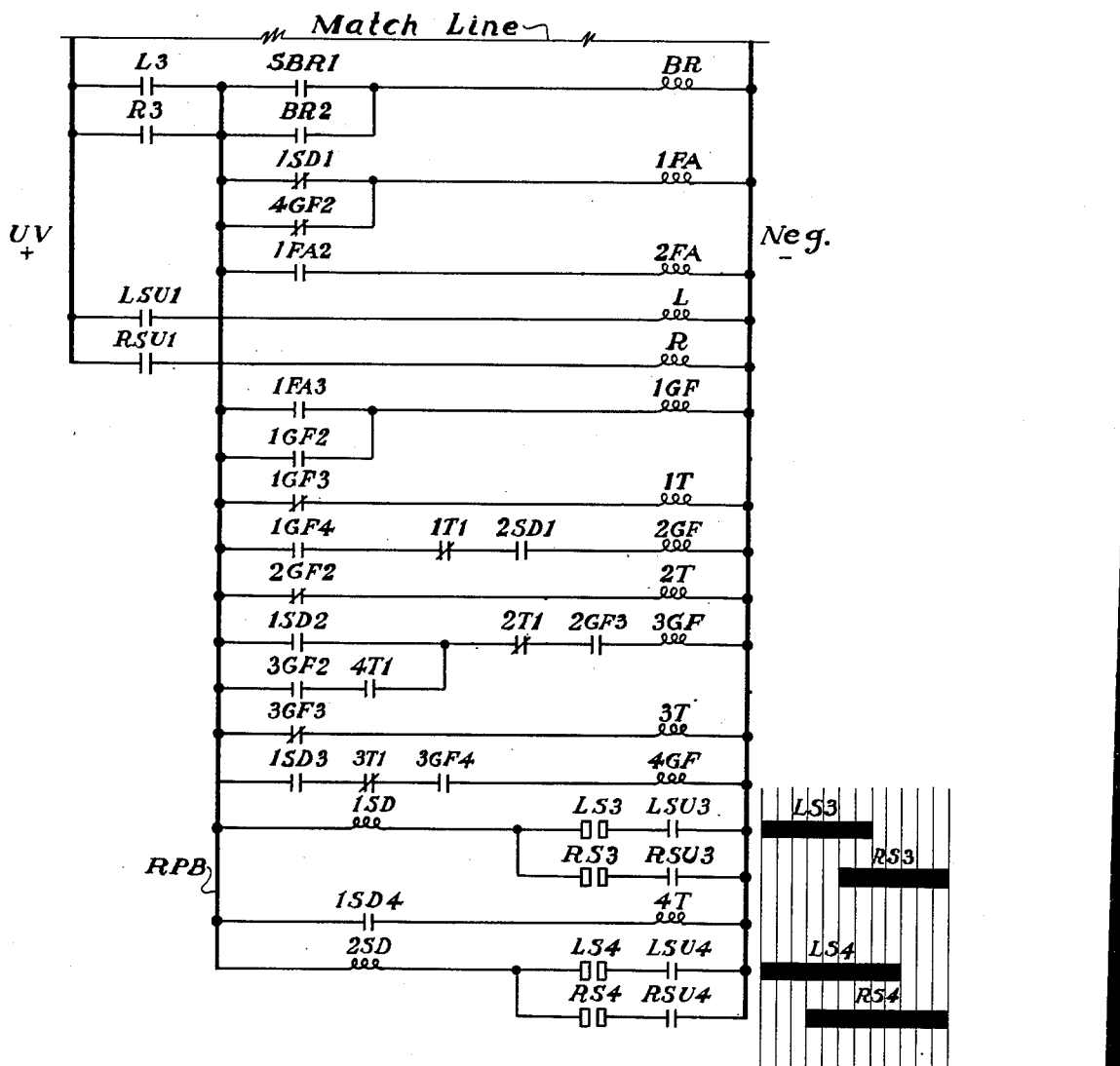
Fig. 2-C

2,370,855

UNITED STATES PATENT OFFICE 2,370,855

SKIP HOIST CONTROL

Gordon Fox, Chicago, Ill., assignor to Freyn Engineering Company, Chicago, Ill., a corporation of Maine Application May 19, 1943, Serial No. 487,550

23 Claims. (Cl. 254—173)

The present invention relates to improvements in skip hoist controls.

In the application filed by the present applicant on December 11, 1942, Serial No. 468,698, entitled Skip hoist controls, there was disclosed a control method and mechanism for the two motors of a skip hoist such as are used in the charging of a blast furnace. In said application a pair of motors were disclosed adapted to be connected to a constant potential direct current electrical supply, which motors were provided with connections whereby transitions from series to parallel arrangements might be effected for meeting conditions arising in the cycle of operation of a skip hoist.

The present invention relates generally to a control method and mechanism for accomplishing purposes analogous to those which constitute the objects of the prior application referred to. However, the present application differs from said prior application, inter alia, in the omission of the series parallel transition referred to and in the use of a variable voltage direct current electrical supply from a motor generator set.

There are advantages in providing two motors for a skip hoist, the two motors being geared up to winding drum means for controlling the two cables of two skips. The normal operation of such a system is, of course, a two-motor operation, though under certain circumstances it is desirable to operate the winding drum means with either one of the two motors referred to.

An object of the present invention is to provide an installation involving skip hoist motors and generators and control mechanism therefor for automatically obtaining a wide speed range for starting, running and dumping by using possible inherent characteristics both of the generators and of the motors to best advantage.

A further object is to provide a drive mechanism and control mechanism associated therewith for a blast furnace skip hoist in which the inherent torque capacity in the equipment is advantageously proportioned and related to the drive requirements.

A further object is to provide a drive mechanism and control mechanism therefor in a blast furnace skip hoist wherein the running horse power requirements and the starting torque requirements are so related that motors of minimum size may be employed.

A further object is to provide a drive mechanism and associated control mechanism for a blast furnace skip hoist employing two motors wherein the motor capacities are utilized to the best advantage.

A further object is to provide a drive mechanism and associated control for a blast furnace skip hoist which drive mechanism and control involve motive means for the skip tubs and a generator for supplying energy to said motive means in which the demands upon the generator are relatively moderate.

A further object is to provide a drive mechanism for a blast furnace skip hoist and a variable voltage control wherein good speed regulation is obtained at the low speed required while dumping the skip, due to inherent characteristics of the motors and generators, without recourse to external regulating devices.

A further object is to provide mechanism for driving and controlling a skip hoist wherein slow-down, as the end of travel is approached, is insured by an independent check on the operation of the automatic means provided to cause such slow-down.

A further object is to provide mechanism for driving and controlling a skip hoist employing two duplicate motors wherein either motor may be employed singly to handle more than half of the rated capacity of the hoist without exceeding the motor size suitable for normal two-motor operation.

A further object is to provide mechanism for driving and controlling a skip hoist employing two duplicate motors wherein the operating speed with single-motor drive may be substantially less than that employed with normal two-motor drive, with a resulting gain in torque capacity.

A further object is to provide mechanism for driving and controlling a skip hoist employing two duplicate motors wherein the motors may be operated at relatively high speed and a relatively high gear ratio may be employed between the motors and the hoist drum.

A further object is to provide mechanism for driving and controlling a blast furnace skip hoist which combines reliability and flexibility with simplicity.

A further object is to provide mechanism for driving and controlling a skip hoist which will afford smooth operation.

A further object is to provide a skip hoist drive involving a hoisting drum and a motor wherein a brake associated with the motor shaft exerts a relatively powerful effect at the hoisting drum shaft.

A further object is to provide mechanism for driving and controlling a skip hoist well adapted to meet the needs of commercial operation.

A further object is to provide mechanism for driving and controlling a blast furnace skip hoist which installation utilizes effectively a variable voltage direct current supply in combination with motor field control in operating the motive means for driving the skips.

Further objects will appear as the description proceeds.

Referring to the drawings:

Figures 2A, 2B and 2C illustrate cooperating portions of an electric circuit and are to be considered together, Figure 2A matching with Figure 2B along the indicated match lines, and Figure 2B matching with Figure 2C along the indicated match lines;

Description of instrumentalities

Figure 1:
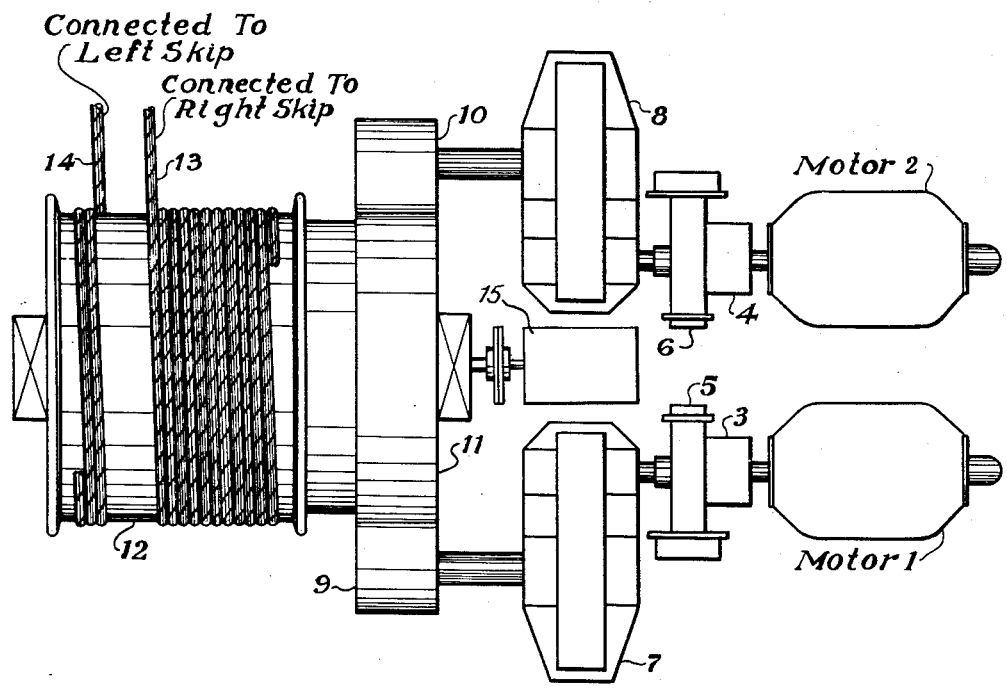
Figure 1 is a diagrammatic view illustrating a winding drum for operating the two cables of a double skip hoist, said winding drum having associated therewith the driving motors, brakes and gearing for controlling said winding drum.

As illustrated in Figure 1, a pair of driving motors 1 and 2 are provided. Said motors 1 and 2 are connected through couplings 3 and 4, respectively, through brakes 5 and 6 to gear reduction units 7 and 8. The low-speed sides of said gear reduction units 7 and 8 are connected, respectively, to pinions 9 and 10, which mesh with the gear 11. Said gear 11 is rigidly secured to the drum 12, which has secured thereto the cables 13 and 14. Said cables 13 and 14 may be connected, respectively, to the right skip and the left skip of a blast furnace charging mechanism. It will be understood that when one or both of the motors 1—2 are energized to cause rotation of the winding drum 12 in one direction, one of the cables 13 will be wound up upon the drum 12, and the other of said cables will be paid off, and, conversely, when the energization of one or both of the motors 1—2 is such as to cause reverse rotation of the winding drum 12, the movements of said cables 13 and 14 will be reversed. Limit switch means connected to be driven in synchronism with the drum 12 are indicated diagrammatically by the numeral 15.

The character M3 and the character G indicate the motor and the generator armature, respectively, of a motor generator set. The caption "Gen. Ser. Fld." represents the series or compounding field winding of the generator armature G. Connected in series circuit with the generator armature G and its series field winding is the overload operating coil OL, the brake relay coil SBR, the stabilizing field winding SF1, the switch and contactor assembly for the two motor armatures M1 and M2 and the stabilizing field winding SF2. The two armatures M1 and M2 are the armatures, respectively, of the motors 1 and 2.

A double-bladed knife switch KS1 is provided, which when thrown in its upper position connects the stabilizing field winding SF1 in circuit, and when thrown to its lower position cuts out said winding SF1 and substitutes therefor a path of low resistance independent of said field winding SF1. A double-bladed knife switch KS2 is provided for similarly controlling the connections of the stabilizing field winding SF2. A double-bladed knife switch KS3 is provided for similarly controlling the connections of the armature M1, and a double-bladed knife switch KS4 is provided for similarly controlling the connections of the armature M2. Directional contactors R1 and R2 are provided for directing current in one direction through the motor armatures M1 and M2, and directional contactors L1 and L2 are provided for alternatively directing current in the opposite direction through said armatures.

The characters "Pos." and "Neg." represent the two sides of an electrical circuit across which is connected the armature Ex of an exciter connected to be driven from the motor M3. Said exciter has an exciting field winding, indicated by the caption "Ex Fld.," which through a rheostat "Rheo.," is connected across the mains Pos. and Neg. The generator armature G is provided with the separately excited winding, indicated by the caption "Gen. Fld.," which is connected across the mains Pos. and Neg. through a circuit to be referred to more in detail presently.

In commercial operation the generator armature G may be assumed to develop approximately 600 volts D. C. maximum. The exciter Ex provides a constant potential D. C. supply, which may be about 230 volts, required for the brakes, generator and motor fields and the magnetic contactors and relays.

Figure 3:
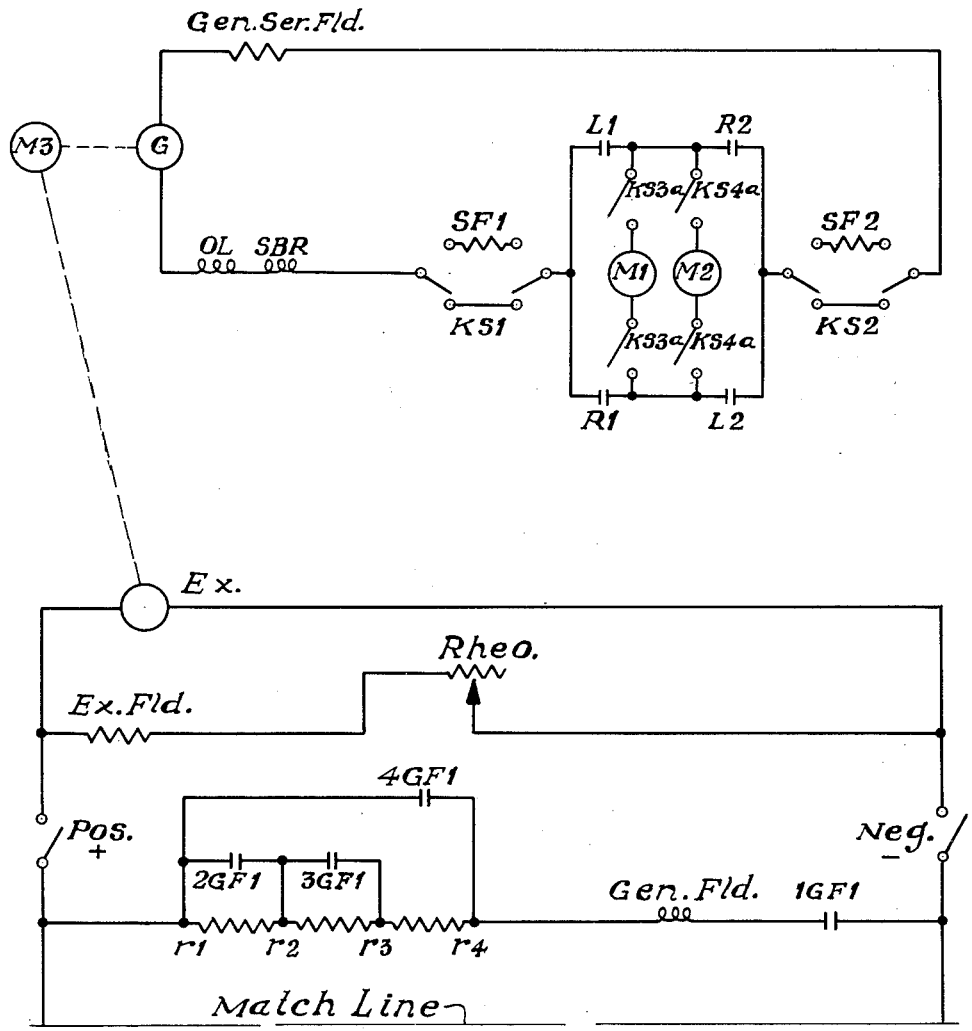
Figure 3 is a figure similar to Figure 2A but showing a parallel relationship between the armatures M1 and M2 of the two driving motors.
Figure 4:
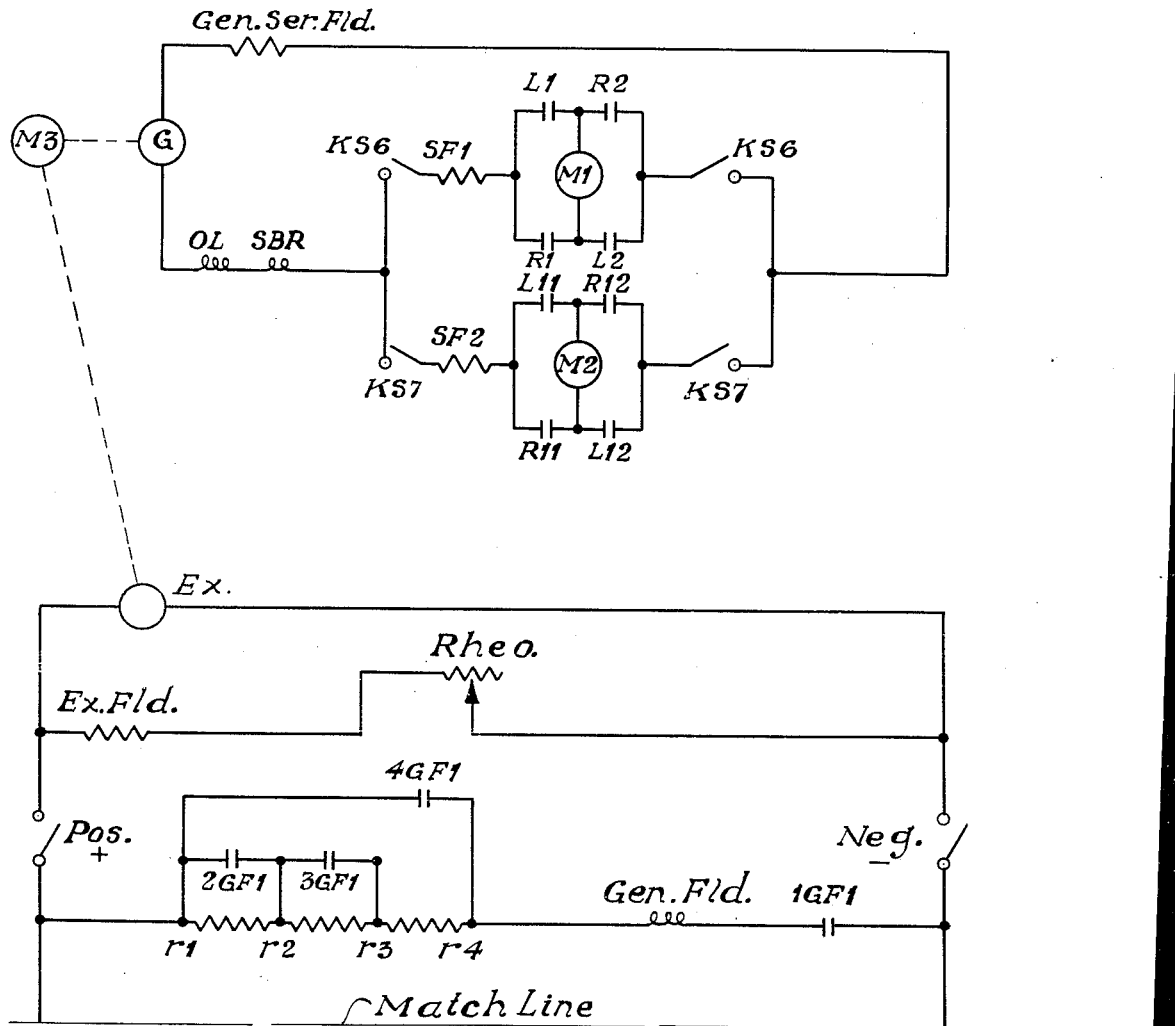
Figure 4 is a view similar to Figure 2A but showing the two motors separated as parallel units, each having its independent series field winding and independent armature.

Figure 2 shows the two motors having the armatures M1 and M2 connected in series with each other. Alternatively these motor armatures may be connected in parallel, for example as illustrated in Figures 3 and 4. This parallel arrangement will be discussed following the discussion of the connection of these two armatures in series. In the event of parallel operation of the motor armatures M1 and M2, the generator armature G according to common practice will supply 300 volts, which will be suitable for either single-motor operation or two-motor operation under parallel conditions.

The shunt field winding "Gen. Fld." is connected across the mains Pos. and Neg. through a circuit which includes two sets of resistors each having a plurality of taps. One of said resistors has the taps $r1$, $r2$, $r3$ and $r4$. The other of said resistors is provided with the taps $r5$, $r6$, $r7$, $r8$ and $r80$. A double-bladed knife switch KS5 is provided for throwing either of said resistors selectably into or out of circuit. Connected to the taps of these resistors are a plurality of relay contacts. Across the taps $r1$ and $r2$ are the relay contacts 2GF1; across the taps $r2$ and $r3$ are the relay contacts 3GF1; across the taps $r1$—$r4$ are the relay contacts 4GF1. Across the taps $r5$—$r6$ are the relay contacts 2GF11; across the taps $r6$—$r7$ are the relay contacts 3GF11; across the taps $r5$ and $r8$ are the relay contacts 4GF11. The relay contacts 2GF1, 3GF1 and 4GF1 are all biased to open position and are adapted to be closed when their corresponding operating coils 2GF, 3GF and 4GF are energized. The relay contacts 2GF11, 3GF11 and 4GF11 are likewise biased to open position and are adapted to be held closed while their corresponding operating coils 2GF, 3GF and 4GF are energized. Also in series with the Gen. Fld. are the generator field relay contacts 1GF1, biased to open position and adapted to be held closed when their corresponding operating coil 1GF is energized.

Also connected across the mains Pos. and Neg. is a circuit including the resistor having the taps $r9$, $r10$, $r11$ and $r12$ and the shunt field winding of motor 1 and the shunt field winding of motor 2. Connected across the taps $r10$ and $r11$ are the motor field relay contacts 1FA1, and connected across the taps $r11$ and $r12$ are the motor field relay contacts 2FA1. Both of these relay contacts are biased to open position and are adapted to be held closed when their corresponding operating coils 1FA and 2FA are energized. Connected across the relay contacts 2FA1 is the single-blade knife switch KS6. The shunt field of motor 1 is controlled by the double-blade knife switch KS7. When said double-blade knife switch KS7 is thrown upwardly, said shunt field winding of motor 1 is in circuit. When said double-blade knife switch KS7 is thrown downwardly, the resistor $r13$—$r14$ is substituted for the shunt field winding of motor 1. The shunt field winding of motor 2 is controlled by the double-blade knife switch KS8. When said double-blade knife switch KS8 is thrown upwardly, the shunt field winding of motor 2 is connected in circuit. When said double-blade knife switch KS8 is thrown downwardly, a resistor $r15$—$r16$ is substituted for the shunt field winding of motor 2. Also connected across the mains Pos. and Neg. is a circuit including the brake relay contacts BR1, biased to open position but held closed when their operating coil BR is energized; the resistor $r17$—$r18$; the brake operating coil of brake 5; and the brake operating coil of brake 6. The brake operating coil of brake 5 is controlled by the double-blade knife switch KS9. When said double-blade knife switch KS9 is thrown upwardly, said brake coil of brake 5 is connected in circuit. When said double-blade knife switch KS9 is thrown downwardly, the resistor $r19$—$r20$ is substituted for the brake coil of brake 5. The brake coil of brake 6 is controlled by the double-blade knife switch KS10. When said double-blade knife switch KS10 is thrown upwardly, said coil of brake 6 is inserted in circuit. When said double-blade knife switch KS10 is thrown downwardly, the resistor $r21$—$r22$ is substituted for said brake coil of brake 6.

Also connected across the mains Pos. and Neg. is a circuit including the push button switch indicated by the word "Reset." This is a double switch including the contacts A and B. This reset switch is of the walking beam type, and when the end thereof marked "Stop" is depressed the contacts A are in circuit-closing position and the contacts B are in open position. When the end of the reset switch marked "Run" is depressed the contacts B are closed and the contacts A are in open-circuit position. The letters UV+ indicate a main whose energization is dependent upon the closure of the contacts UV1. When contacts UV1 are closed the main UV+ is an extension of and has the same polarity as Pos. main. The contacts A and B are adapted to control parallel circuits. Contacts A connect to the Pos. main whereas contacts B connect to the main UV+. Contacts A and B are so disposed relative to each other that contacts B close before contacts A open.

The undervoltage relay contacts UV1 are controlled by the operating coil UV. When said coil UV is energized, said contacts UV1 will be held in closed position, and when said coil UV is deenergized said contacts UV1 will be in open position. The circuit which includes the reset switch also includes the operating coil UV, immediately above referred to; the overload relay contacts OL1 (biased to closed position); the slack cable relay contacts SC (biased to closed position); the overspeed relay contacts OS1 (biased to closed position); and three branches, as follows: The first branch, including the directional relay contacts RSU2 (biased to closed position), and the limit switch contacts LS1; the second branch including the directional relay contacts LSU2 (biased to closed position) and the limit switch RS1; and the third branch consisting of the motor field relay contacts 2FA2 (biased to open position) and the generator field relay contacts 3GF5. The overload relay contacts OL1 are responsive to the overload relay operating coil OL and are closed when the coil OL is deenergized but opened when the coil OL is strongly energized by an overload. The slack cable contacts SC, biased to closed position, are responsive to mechanism, not illustrated, operative to open the contacts SC when predetermined cable slack occurs. Contacts OS1, biased to closed position, are responsive to drum or cable speed through mechanisms not illustrated. The directional relay contacts RSU2 and LSU2 are both biased to closed position and are responsive to the directional relay operating coils RSU and LSU respectively, being held open when their respective coils are energized. The motor field relay contacts 2FA2, biased to open position, are responsive to the motor field relay operating coil 2FA, being held closed when said coil 2FA is energized. The generator field relay contacts 3GF5, biased to closed position, are responsive to the generator field relay operating coil 3GF, being held open when said coil is energized. The limit switch contacts LS1 and RS1 are responsive to a limit switch, to be referred to presently.

Connected across the mains UV+ and Neg. is a circuit including the contact C adapted to be operated by the walking beam switch WB. At one end of said switch WB is the button LSUB, and at the other end thereof is the button RSUB. When said button LSUB is depressed, said contact C is in closing position, and when said button RSUB is depressed, said contact C is in open position. The circuit of the contact C of the switch WB also includes the directional relay operating coil LSU, above referred to, and the limit switch LS2.

Also connected across the mains UV+ and Neg. is the contact D of the walking beam switch WB. When the button LSUB of said switch WB is depressed, contact D is in open position, and when the button RSUB of the switch WB is depressed, said contact D is in circuit-closing position. In the circuit of the contact D is the directional relay operating coil RSU, above referred to, and the limit switch contacts RS2.

The letters RPB indicate a running positive bus, the connection of which to the main UV+ is controlled by the two contacts L3 and R3 disposed in parallel relationship with each other. These contacts are both biased to open position and are responsive, respectively, to the directional contactor coils L and R, to be referred to presently. Said contacts L3 and R3 are held closed when their corresponding operating coils are energized.

Connected between the running positive bus RPB and the negative main Neg. is the circuit including the series brake relay contacts SBR1, biased to open position, and the brake relay operating coil BR above referred to. The contacts SBR1 are responsive to the series brake relay operating coil SBR, being held closed when the coil SBR is energized. In parallel relationship with the contacts SBRI are the brake relay contacts BR2 biased to open position. These contacts BR2 are responsive to the coil BR, being held closed when said coil BR is energized.

Also connected between the running positive bus RPB and the negative main Neg. is the circuit including the first slow-down relay contacts ISDI biased to closed position, and the motor field relay operating coil IFA. Said contacts ISDI are responsive to the first slow-down relay operating coil ISD, being held open when said coil ISD is energized. In parallel relationship with the contacts ISDI are the generator field relay contacts 4GF2, biased to closed position. These contacts 4GF2 are responsive to the generator field relay operating coil 4GF, being held open when said coil 4GF is energized.

Also connected between the running positive bus RPB and the negative main Neg. is the circuit including the motor field relay contacts IFA2, biased to open position, and the motor field relay operating coil 2FA. Said contacts IFA2 are responsive to the motor field relay operating coil IFA, being held closed when said coil IFA is energized.

Connected across the mains UV+ and Neg. is a circuit including the directional relay contacts LSUI and the directional contactor operating coil L. Said contacts LSUI are biased to open position but are held closed when the directional relay operating coil LSU is energized.

Also connected across the mains UV+ and Neg. is a circuit including the directional relay contacts RSUI and the directional contactor operating coil R. Said contacts RSUI are biased to open position but are held closed when the directional relay operating coil RSU is energized.

Connected across the running positive bus RPB and the negative main Neg. is a circuit including the motor field relay contacts IFA3, biased to open position, and the generator field relay operating coil IGF. Said contacts IFA3 are responsive to the motor field relay operating coil IFA, being held closed when said coil IFA is energized. In parallel relationship with the contacts IFA3 are the generator field relay contacts IGF2 biased to open position. These contacts IGF2 are responsive to the generator field relay operating coil IGF, being held closed when said coil IGF is energized. Also connected between the running positive bus RPB and the negative main Neg. is a circuit including the generator field relay contacts IGF3, biased to closed position, and the time-delay relay operating coil IT. The contacts IGF3 are responsive to the generator field relay operating coil IGF, being held open when said coil IGF is energized. The operating coil IT is part of a time-delay relay, the contacts of which will be discussed presently. Also connected between the running positive bus RPB and the negative main Neg. is the circuit including the generator field relay contacts IGF4, biased to open position, the contacts ITI operated by the coil IT, biased to closed position, the second slow-down relay contacts 2SDI biased to open position, and the generator field relay operating coil 2GF. The generator field relay contacts IGF4 are responsive to the generator field relay operating coil IGF, being held closed when said operating coil is energized. The contacts ITI are responsive to the operating coil IT and will open upon energization of the operating coil IT, and will close after the lapse of a predetermined time interval after the deenergization of the operating coil IT. The second slow-down relay contacts 2SDI are responsive to the second slow-down relay operating coil 2SD, being held closed when said operating coil is energized.

Also connected between the running positive bus RPB and the negative main Neg. is the circuit including the generator field relay contacts 2GF2, biased to closed position, and the time-delay relay operating coil 2T. Said contacts 2GF2 are responsive to the generator field relay operating coil 2GF, being held open when said coil 2GF is energized.

Also connected between the running positive bus RPB and the negative main Neg. is a circuit including the first slow-down relay contacts ISD2, biased to open position, time-delay relay contacts 2TI biased to closed position, the generator field relay contacts 2GF3 biased to open position, and the generator field relay operating coil 3GF. In parallel relationship with the contacts ISD2 is a circuit including the generator field relay contacts 3GF2 and the time-delay relay contacts 4TI, both biased to open position. The contacts ISD2 are responsive to the first slow-down relay operating coil ISD, being held closed when said coil is energized. The contacts 2TI are responsive to the time-delay relay operating coil 2T and will open upon energization of the operating coil 2T, closing after the lapse of a predetermined time interval following the deenergization of the operating coil 2T. The generator field relay contacts 2GF3 are responsive to the generator field relay operating coil 2GF, being held closed when said coil is energized. The generator field relay contacts 3GF2 are responsive to the generator field relay operating coil 3GF, being held closed when said coil is energized. The contacts 4TI are part of a time-delay relay, closing upon energization of the operating coil 4T and opening after the lapse of a predetermined time interval following the deenergization of said operating coil 4T.

Also connected between the running positive bus RPB and the negative main Neg. is the circuit including the generator field relay contacts 3GF3 biased to closed position, and the operating coil 3T of a time-delay relay. The contacts 3GF3 are responsive to the generator field relay operating coil 3GF, being held open when said coil is energized.

Also connected between the running positive bus RPB and the negative main Neg. is a circuit including the first slow-down relay contacts ISD3 biased to open position, contacts 3TI biased to closed position, generator field relay contacts 3GF4 biased to open position, and the generator field relay operating coil 4GF. The contacts ISD3 are responsive to the first slow-down relay operating coil ISD, being held closed when said coil is energized. The contacts 3TI are responsive to the operating coil 3T and will open upon energization of the operating coil 3T, closing again after the lapse of a predetermined time interval following the deenergization of the operating coil 3T. The contacts 3GF4 are responsive to the generator field relay operating coil 3GF, being held closed when said coil is energized.

Also connected between the running positive bus RPB and the negative main Neg. is a circuit including the first slow-down relay operating coil ISD, the limit switch contacts LS3 and directional relay contacts LSU3. In parallel relationship with the portion of this circuit including the limit switch contacts LS3 and the directional relay contacts LSU3 is a branch including the limit switch contacts RS3 and the directional relay contacts RSU3. The limit switch contacts LS3 and RS3 are adapted to be controlled by a limit switch to be referred to more in detail presently. The contacts LSU3 and RSU3 are responsive, respectively, to the operating coils LSU and RSU, said contacts being held closed when their respective operating coils are energized.

Also connected between the running positive bus RPB and the negative main Neg. is a circuit including the first slow-down relay contacts ISD4, biased to open position, and the operating coil 4T of a time-delay relay having the contacts 4T1 above referred to. The contacts ISD4 are responsive to the first slow-down relay operating coil ISD and are held closed when said coil ISD is energized.

Also connected between the running positive bus RUB and the negative main Neg. is a circuit including the second slow-down relay operating coil 2SD, the limit switch contacts LS4, and the directional relay contacts LSU4 biased to open position. Said limit switch contacts LS4 are adapted to be bridged by a limit switch segment, to be referred to presently. The contacts LSU4 are responsive to the directional relay operating coil LSU, being held closed when said coil LSU is energized. Connected across that part of the circuit including the limit switch contacts LS4 and contacts LSU4 is a branch circuit including the limit switch contacts RS4 and the directional relay contacts RSU4 biased to open position. The limit switch contacts RS4 are adapted to be bridged by a mechanism to be referred to presently. The contacts RSU4 are responsive to the directional relay operating coil RSU, being held closed while said coil RSU is energized.

The limit switch contacts LS1, RS1, LS2, RS2, LS3, RS3, LS4 and RS4 are adapted to be bridged and unbridged by bridging members or segments bearing the corresponding reference characters. The bridging members may be fixed to a drum controller and will move in unison in performing their functions with their corresponding contacts, this movement being responsive to the movement of the skips.

Figures 3 and 4 are similar to Figure 2A but show arrangements for connecting the motor armatures M1 and M2 in parallel relationship. In this parallel operation, according to either Figure 3 or Figure 4 the double pole switch KS5 of Figure 2A may be replaced by a permanent connection or left permanently in its uppermost position, in either of which cases the resistor r5—r6—r7—r8—r80 and its cooperating contacts 2GF11, 3GF11 and 4GF11 are thrown out of service.

In Figure 3 current for both armatures M1 and M2 passes through each of the stabilizing windings SF1 and SF2. Connections to the armature M1 are controlled through the double pole switch KS3a, and connections to the armature M2 are controlled by the double pole switch KS4a.

According to the parallel arrangement illustrated in Figure 4, the motors are separated as units, each motor armature M1 or M2 having its independent stabilizing field winding SF1 or SF2 respectively. According to the parallel arrangement disclosed in Figure 4, additional reversing contactors L11, L12, R11 and R12 are employed. Double pole knife switches KS6 and KS7 are used to control the connections of the complete motors having the armatures M1 and M2 respectively. The contacts L11 and L12 will be closed when the coil L is energized, and the contacts R11 and R12 will be closed when the coil R is energized.

*Normal two-motor operation*

For a normal two-motor operation, the knife switches KS1 and KS2 are thrown upwardly so that the motor stabilizing fields SF1 and SF2 are in circuit. The switches KS3 and KS4 are moved to the right to connect the armatures M1 and M2 of the two motors 1 and 2 in circuit. The knife switch KS5 is thrown upwardly to connect the resistors r1—r2—r3—r4 in circuit with the generator field marked "Gen. Fld." Knife switch KS6 is left open. Knife switches KS7 and KS8 are thrown upwardly to connect the motor shunt field 1 and motor shunt field 2 in circuit. The switches KS9 and KS10 are thrown upwardly to connect the brake coils of brakes 5 and 6 in circuit.

The undervoltage relay coil UV is connected in series with the overload relay contacts OL1, the slack cable contacts SC (responsive to slack cable through mechanism not disclosed), overspeed contacts OS1 (which may be responsive to a centrifugal switch), contacts RSU2 and limit switch contacts LS1. Contacts OL1, SC, OS1 and RSU2 are all in closed position and the limit switch contacts LS1 (or the limit switch contacts RS1) are bridged at this time.

Energization of the coil UV is accomplished by depressing the "Stop" button of the reset switch, thereby moving the contact A thereof into closing position. Energization of the coil UV results in the closure of the contacts UV1. A holding circuit for the coil UV is provided through contacts B of the reset button inasmuch as contacts B close before contacts A open. Relay contacts UV1 therefore remain closed after the run button has been depressed to move the contacts A to open position and the contacts B to closed position.

When the hoist is at rest the motor generator set including the motor M3 and the generator armature G is in operation but the generator voltage is zero. The motor brakes 5 and 6 are set and motor shunt field 1 and motor shunt field 2 are weakened due to the series connection therewith of the resistor r9—r10—r11—r12.

To start the movement of the right skip from its lowermost position the push button RSUB is depressed, resulting in the closure of the switch D and the energization of the coil RSU, since the limit switch contacts RS2 are bridged at this time. Energization of the coil RSU results in the closure of the contacts RSU1, causing the energization of the operating coil R, which results in the closing of its contacts R1, R2 and R3. This completes the main circuit of the generator armature G and the motor armatures M1 and M2 of the two motors 1 and 2. No current flows in this circuit, however, at this time, inasmuch as the generator field circuit marked "Gen. Fld." is open at the contacts 1GF1.

Closure of the contacts R3 energizes the running positive bus RPB. As one result, the field relay coil 1FA is energized inasmuch as the contacts 4GF2 are biased to closed position and are closed at this time. Energization of the coil 1FA results in the closure of the contacts 1FA1, which short-circuit the section r10—r11 of the resistor in series with motor Sh. Fld. 1 and motor Sh. Fld. 2. Energization of the coil 1FA also results in the closure of the contacts IFA2, which results in the energization of the field relay coil 2FA. Energization of the coil 2FA results in the closure of the contacts 2FA1, resulting in the short-circuiting of the section of resistors r11—r12 in circuit with motor Sh. Fld. 1 and motor Sh. Fld. 2. Thus these motor fields are strengthened and "forced" to approximate saturation.

The energization of the field relay coil IFA also results in the closure of the contacts IFA3, which causes the energization of the generator field relay coil IGF. Energization of this coil results in the closure of the contacts IGF1, which completes circuit of the field winding Gen. Fld. of the generator armature G, this circuit including the resistor r1—r2—r3—r4. Voltage is therefore developed in the armature G and current flows in the main circuit through the motor armatures M1 and M2.

Current in this circuit flowing through the brake relay coil SBR results in the closure of the contacts SBR1, thereby energizing the brake relay coil BR. Energization of this brake relay coil BR results in the closure of the contacts BR1, causing the energization of the coils of brakes 5 and 6, resulting in the release of these brakes. The brake relay coil BR sets up a maintaining circuit for itself through its contacts BR2. When the brakes release, movement of the hoist starts. When the generator field relay operating coil IGF is energized and closes its contacts IGF2, it thereby sets up a maintaining circuit for itself. Energization of the relay coil IGF also results in the opening of the contacts IGF3, which interrupts the circuit of the timing relay coil IT (closed when the running positive bus RPB is energized). Inasmuch as the relay including the coil IT is a time-delay relay, said relay operates after the lapse of a predetermined time interval to cause contacts IT1 to close. Since contacts IGF4 and 2SD1 are closed at this time, closure of contacts IT1 energizes the operating coil 2GF. Said coil 2GF therefore closes its contacts 2GF1, thereby short-circuiting the resistor r1—r2 in the field circuit for the generator armature G. In consequence the voltage generated in the armature G increases and the hoist is accelerated.

Energization of the relay coil 2GF causes its contacts 2GF2 to open-circuit the relay coil 2T. After a predetermined time interval time-delay relay contacts 2T1 close and generator field relay coil 3GF is energized, since the contacts ISD2 and 2GF3 are closed at this time. A maintaining circuit is made through the contacts 3GF2 and 4T1 (contacts 4T1 being held in closed position by reason of the energization of its operating coil 4T, energized because contacts ISD4 are closed). Closure of the contacts 3GF1 short-circuits the resistors r2—r3 in the generator field circuit, thereby further increasing the generator voltage and consequently increasing the motor speed.

Energization of the relay coil 3GF causes its contacts 3GF3 to open, thereby deenergizing the time-delay relay coil 3T. This deenergization of the relay coil 3T results after a time delay in the closure of the contacts 3T1. This causes the energization of the generator field relay coil 4GF, inasmuch as the contacts ISD3 and 3GF4 are closed at this time. The resulting closure of the contacts 4GF1 results in the short-circuiting of the resistor r3—r4 in the generator field circuit, thereby further increasing the generator voltage in the armature G to its maximum value, which in the series relationship of the motors 1 and 2 has been assumed to be about 600 volts.

The motors 1 and 2 now operate with approximately 300 volts across each of the armatures M1 and M2 and with their fields forced. The hoist speed under these conditions may approximate 300 feet per minute.

Energization of the generator field relay 4GF causes its contacts 4GF2 to open, thereby deenergizing the relay coil IFA, since at this time the contacts ISD1 are open. Deenergization of the motor field relay coil IFA results in the opening of the contacts IFA1, introducing resistor r10—r11 into the field circuit of motor Sh. Fld. 1 and motor Sh. Fld. 2. Opening of the contacts IFA2 results in the deenergization of the relay coil 2FA, causing the opening of the contacts 2FA1, introducing the resistor r11—r12 into the circuit of motor Sh. Fld. 1 and motor Sh. Fld. 2. The introduction of resistors r10—r11—r12 into the field circuits of the motors weakens these fields and causes the hoist speed to increase to perhaps 500 feet per minute.

The hoist continues to run at this top speed until the slow-down point is reached. At this point the limit switch contacts RS3, which were closed at the beginning of the cycle when the running positive bus RPB was energized, are opened. This causes the deenergization of the first slow-down relay coil ISD, resulting in the closure of the contacts ISD1, resulting in the energization of the motor field relay coil IFA. The resulting closure of the contacts IFA1 short-circuits the resistor r10—r11, and the resulting closure of the contacts IFA2 causes the energization of the field relay coil 2FA. This results in the closure of the contacts 2FA1, thereby short-circuiting the resistor r11—r12. Thus the motor fields are strengthened and forced.

The deenergization of the first slow-down relay coil ISD also results in the opening of its contacts ISD3, thereby deenergizing the generator field relay coil 4GF. This results in the opening of contacts 4GF1, introducing the resistor r3—r4 into the generator field circuit, Gen. Fld., reducing the voltage produced by the generator armature G.

The deenergization of the first slow-down relay coil ISD also results in the opening of the contacts ISD4, thereby deenergizing the timing relay coil 4T. After a time delay inherent in this instrumentality, contacts 4T1 will open. Since the contacts ISD2 are already open, the generator field relay coil 3GF is deenergized, resulting in the opening of the contacts 3GF1, introducing resistor r2—r3 into the generator field circuit, reducing the voltage produced by the armature G to about 230 volts, that is—about 115 volts for each of the motor armatures M1 and M2. The corresponding hoist speed with the motor fields forced may be about 120 feet per minute.

When the hoist has run a short distance at this speed, the slow-down-check point in the limit switch is reached. At this point the limit switch contacts RS1 open. Continuity of the UV relay coil circut is then dependent solely upon the circuit through the contacts 2FA2 and contacts 3GF5, inasmuch as the contacts RSU2 are open. Contacts 2FA2 are closed if the motor fields have been forced, and contacts 3GF5 are closed if the generator field relay coil 3GF has been deenergized. Under these circumstances the hoist speed necessarily has been reduced to a safe degree. If contacts 2FA2 have not closed, or if the relay coil 3GF has not been deenergized to permit closure of the contacts 3GF5, the relay coil UV is deenergized and the hoist is stopped.

However, if the contacts 2FA2 have closed and the contacts 3GF5 are closed, the hoist, after it has traveled a short additional distance, will reach the second slow-down point. At this point limit switch contacts RS4 are opened. The second slow-down relay coil 2SD is thereby deenergized and contacts 2SD1 are opened, resulting in the deenergizing of the relay coil 2GF. This results in the opening of the contacts 2GF1, introducing the resistor $r1$—$r2$ into the generator field circuit. This causes the voltage developed by the generator armature G to decrease to about 150 volts (75 volts per motor armature). The hoist speed then decreases to about 75 feet per minute.

The hoist continues to run at this speed until the end of its trip. Limit switch contacts RS2 then open, deenergizing the directional relay coil RSU, resulting in the opening of the contacts RSU1 and the deenergizing of the directional contactor coil R. This results in the opening of the contacts R1 and R2, thereby opening the main circuit of the two-motor armatures M1 and M2. The deenergization of the directional contactor coil R also results in the opening of the contacts R3, deenergizing the running positive bus RPB. This causes the deenergization of the brake relay coil BR, resulting in the opening of the contacts BR1 and the setting of the brakes 5 and 6. The deenergization of the running positive bus RPB results in the deenergization of the relay coil 1GF, causing the opening of the contacts 1GF1 and opening the generator field circuit, reducing to zero the voltage developed by the generator armature G. Deenergization of the running positive bus RPB also causes the deenergization of the motor field relay coils 1FA and 2FA, causing the opening of their corresponding contacts 1FA1 and 2FA1, inserting resistors $r10$—$r11$—$r12$ into motor Sh. Fld. 1 and motor Sh. Fld. 2, whereby to decrease their heating while the hoist is at rest.

The procedure above discussed has brought the right skip to the top of the furnace and the left skip to the skip pit. When the left skip is loaded the button LSUB is depressed, causing energization of the directional relay coil LSU and the closure of its corresponding contacts LSU1. This results in the energization of the directional contactor coil L, closing the contacts L1 and L2. The remainder of the cycle is similar to the cycle previously described in connection with the lifting of the right skip, it being understood, of course, that contacts LS1, LS2, LS3 and LS4 in the limit switch govern the circuits in the upward travel of the left skip, since the directional relay coil LSU is energized at this time and the directional relay coil RSU is open at this time.

*Single-motor operation*

At times it may be desired to remove one of the motors, 1 or 2, from service. By way of example, if it is desired to remove motor 2 from service the knife switch KS2 is thrown downwardly in order to isolate the stabilizing field SF2; knife switch KS4 is thrown to the left in order to isolate armature M2, substituting a jumper therefor; knife switch KS8 is thrown downwardly whereby to substitute the resistor $r15$—$r16$ for the field of motor 2; knife switch KS5 is thrown downwardly in order to substitute resistors $r5$—$r6$—$r7$—$r8$—$r80$ in place of resistors $r1$—$r2$—$r3$—$r4$. Knife switch KS6 is closed whereby to short-circuit the resistor $r11$—$r12$.

The functioning of the hoist and control is, generally speaking, the same as with two-motor operation, with these exceptions: Resistor $r5$—$r6$—$r7$—$r8$—$r80$ is subdivided differently from resistors $r1$—$r2$—$r3$—$r4$. When only resistor $r8$—$r80$ is in circuit the generator armature G will develop about 300 volts. This portion of the total resistance is always in circuit. Thus the maximum voltage generated is restricted to the amount required for one motor. Since the knife switch KS6 is closed, short-circuiting the motor field resistor $r11$—$r12$, motor Sh. Fld. 1 and motor Sh. Fld. 2 are not weakened as much as with two-motor operation. Therefore the speed attained by the hoist is restricted below that for two-motor operation. This is desirable in view of the fact that only half the motor capacity is available. Yet it may be desired to handle loads exceeding one-half of the loads handled with two-motor operation.

*Parallel operation of motors*

The principles of operation of the present invention as applied to series operation of motors can be applied to a hoist having the two motor armatures connected in parallel. In such event the generator voltage will be about 300 volts maximum instead of 600 volts. In this parallel operation of motors the knife switch KS5 may be replaced by a permanent connection, or left permanently in its uppermost position, and only one set of resistors $r1$—$r2$—$r3$—$r4$ is required for either two-motor or single-motor operation.

Parallel operation of motors has the following advantages: Lowered main circuit voltage (300 vs. 600); and the current for single-motor operation is low with respect to generator capacity, so that the requirements of single-motor operation do not dictate use of an oversize generator. When the two motors are connected in series, the reduction of voltage from 600 to 300 volts for single-motor operation cuts the generator capacity in two. If it is desired to handle a substantial load, the relatively high starting torque required for single-motor operation (since the skip tub weight is proportionately more) dictates a larger generator than is necessary for two-motor operation.

*Motor speed characteristics*

The general scheme of the drive and control described hereinabove is advantageous in respect to the inherent speed regulation characteristics of the motors.

The stabilizing windings can be relatively strong with respect to the weakened fields when running at top speed, affording a somewhat drooping speed characteristic, causing a heavy load to be hoisted at a lower speed than a light load. This drooping characteristic is essential to load division when the two motors are operated in parallel.

At low speed, when the fields are forced, the magnetic material in the motors is substantially saturated. Therefore the series or stabilizing windings have relatively little effect and do not cause an appreciable speed droop under load at low speeds. In other words, the drive according to the present invention has a drooping characteristic at full speed and a substantially flat speed characteristic at low speed, which is a desirable condition.

Advantages

The construction above described has the following advantages as compared with a drive employing only voltage variation for the entire speed range. The motor field strength is varied and the fields are forced at starting. The drive has an inverse torque characteristic developing more torque per armature ampere at low speed. This corresponds with the requirements of the drive. The gear ratio between the motors on the one hand and the hoist drum on the other will be related to the weak field speed of the motors. This is substantially higher than their base speed. Therefore a substantially higher gear ratio results.

The combination of these considerations means that for a given motor frame and rating a higher torque per armature ampere is developed due to forced fields, and the motor torque is more effective due to increased gear ratio. Therefore much less armature current is required to start the hoist. Since starting torque is normally the criterion of motor adequacy, the present improvement will in many cases permit the use of a smaller motor frame.

Since about half of the speed range is obtained by field weakening, only about half of the speed range need be obtained by voltage variation. Therefore it is not necessary to reduce the voltage below practical limits in order to secure a suitable dumping speed. For instance, the voltage per motor armature may be about 100 volts (200 volts on the generator) instead of 50 volts (100 volts on the generator), which would be required if the entire speed range were obtained by varying the voltage. The main circuit IR drop is proportionately less as related to this higher voltage. For instance, 50 volts drop is half of 100 volts and only one-quarter of 200 volts. Moreover, due to the inverse torque characteristic and the high gear ratio, the armature amperes at dumping speed are less according to the present invention than with the prior art. Hence the voltage drop is actually much less and also proportionately less detrimental. Therefore the speed regulation is much improved. It is further feasible with the present invention to provide a cumulative series field on the generator of sufficient strength to over-compound the generator, whereby to compensate approximately for the main circuit IR drop. This was not feasible with the prior art due to inability satisfactorily to subdivide the very small amount of generator field magnetization corresponding to about 100 volts generated voltage on a 600-volt generator between two fields, namely—a shunt field having almost no magnetization, and a series field having a magnetization proportional to the load.

Due to the higher gear ratio, and due also to the forced fields of the motor, a single motor of a given size can start a heavier load according to the present invention than a hoist having a constant torque characteristic and a low gear ratio, as commonly found in the prior art. It is possible to avoid operating a single motor under weak field conditions where its torque capacity is limited. The speed is thus restricted within the ability of a single motor to handle it. Hence the present invention is superior to the prior art with respect to emergency single-motor operation.

Many modifications of the present invention will occur to those skilled in the art. It is intended to cover all such modifications that fall within the scope of the appended claims.

What is claimed is:

1. In a skip hoist, in combination, winding drum means having cables attached thereto adapted to be connected to a pair of skips, a pair of driving motors for said drum means, a variable voltage generator for supplying current to said motors, said generator having a field winding, exciting means for energizing said field winding, said generator also having a series field winding, each of said motors being provided with a shunt field winding and with a stabilizing field winding, said stabilizing field windings being adapted to be excited by the current delivered by said generator, and control means for modifying the energization of said generator field winding and said motor shunt field windings.

2. In a skip hoist, in combination, winding drum means having cables attached thereto adapted to be connected to a pair of skips, a pair of driving motors for said drum means, a variable voltage generator for supplying current to said motors, said generator having a field winding, exciting means for energizing said field winding, said generator also having a series field winding, each of said motors being provided with a shunt field winding, and limit switch means responsive to said winding drum means for modifying the energization of said generator field winding and said motor shunt field windings.

3. Drive means for a skip hoist comprising a pair of motors, a generator for supplying current to said motors, exciting means, each of said motors having a shunt field winding adapted to be energized by said exciting means, said generator having a field winding adapted to be excited by said exciting means, said generator also having a series field winding, each of said motors having a stabilizing field winding adapted to be excited by current from said generator, and control means for controlling the speed of said motors by varying the strength of the shunt fields thereof.

4. Drive means for a skip hoist comprising a pair of motors, a generator for supplying current to said motors, exciting means, each of said motors having a shunt field winding adapted to be energized by said exciting means, said generator having a field winding adapted to be excited by said exciting means, said generator also having a series field winding, each of said motors having a stabilizing field winding adapted to be excited by current from said generator, and control means for controlling the speed of said motors by varying the shunt fields of said motors and by varying the voltage developed by said generator.

5. Drive means for a skip hoist comprising a pair of motors, a generator for supplying current to said motors, exciting means, each of said motors having a shunt field winding adapted to be energized by said exciting means, said generator having a field winding adapted to be excited by said exciting means, each of said motors having a stabilizing field winding adapted to be excited by current from said generator, and control means for controlling the speed of said motors by varying the strength of the shunt fields thereof.

6. Drive means for a skip hoist comprising a pair of motors, a generator for supplying current to said motors, exciting means, each of said motors having a shunt field winding adapted to be energized by said exciting means, said generator having a field winding adapted to be excited by said exciting means, said generator also having a series field winding, and control means for controlling the speed of said motors by substantially varying the shunt fields of said motors and by varying the voltage developed by said generator.

7. In a skip hoist, in combination, winding drum means, a pair of motors for driving said winding drum means, a generator for supplying current to said motors, directional switch means for controlling the direction of current from said generator through said motors, exciting means, each of said motors having a shunt field winding adapted to be excited by said exciting means, each of said motors having a stabilizing field winding adapted to be energized by current from said generator, said generator having a field exciting winding adapted to be energized from said exciting means, means for varying the current in said field exciting winding of said generator, and other means for varying the current in the shunt field windings of the motors.

8. In a skip hoist, in combination, winding drum means, a pair of motors for driving said winding drum means, a generator for supplying current to said motors, directional switch means for controlling the direction of current from said generator through said motors, exciting means, each of said motors having a shunt field winding adapted to be excited by said exciting means, each of said motors having a stabilizing field winding adapted to be energized by current from said generator, said generator having a field exciting winding adapted to be energized from said exciting means, and means for varying the current in said field exciting winding of said generator and other means for varying the current in the shunt field windings of the motors, said generator also having a series field winding.

9. In a skip hoist, in combination, winding drum means, a pair of motors for driving said winding drum means, a generator for supplying current to said motors, directional switch means for controlling the direction of current from said generator through said motors, exciting means, each of said motors having a shunt field winding adapted to be excited by said exciting means, each of said motors having a stabilizing field winding adapted to be energized by current from said generator, said generator having a field exciting winding adapted to be energized from said exciting means, said generator also having a series field winding, a pair of brakes for said motors, electric control means for said brakes, and limit switch means for controlling the energization of said generator field winding, said motor shunt field windings and said electric control means.

10. In a skip hoist, in combination, winding drum means, a pair of motors for driving said winding drum means, a generator for supplying current to said motors, exciting means, each of said motors having a shunt field winding adapted to be energized by said exciting means, each of said motors having a stabilizing field winding adapted to be excited by current from said generator, and control means for said motors including means for forcing the fields of said motors and for weakening the fields of said motors.

11. In a skip hoist, in combination, winding drum means, a pair of motors for operating said winding drum means, a generator for supplying current to said motors, exciting means, shunt field windings for said motors adapted to be excited by said exciting means, and control means including limit switch means for controlling the speed of said motors by variation of the voltage of said generator and by forcing and by weakening the fields of said motors, said control means including means for controlling the direction of rotation of said motors by reversing the connections to the armatures of said motors.

12. In a skip hoist, in combination, winding drum means, a pair of motors for operating said winding drum means, a generator for supplying current to said motors, exciting means, shunt field windings for said motors adapted to be excited by said exciting means, stabilizing field windings for said motors adapted to be excited by said generator, and control means including limit switch means for controlling the speed of said motors by variation of the voltage of said generator and by modification of the field strength of said motors, said control means including means for controlling the direction of rotation of said motors by reversing the connections to the armatures of said motors.

13. Drive means for a skip hoist including a pair of motors each having a shunt field winding, a generator for providing electrical energy for said motors, means for controlling the speed of said motors including means for varying the voltage developed by said generator and also including means for varying the energization of said shunt field windings, and switch means for connecting either one of said motors in circuit to the exclusion of the other and for modifying said controlling means to limit the maximum speed of said one motor to a lower value than the maximum speed with said two motors.

14. In a skip hoist, in combination, winding drum means, a pair of motors for driving said winding drum means, a generator for supplying current to said motors, directional switch means for controlling the direction of current from said generator through said motors, switch means for connecting said motors in series relationship with each other or selectably connecting either motor in circuit alone, exciting means, each of said motors having a shunt field winding adapted to be excited by said exciting means, means for varying the strength of said shunt field windings, said generator having a field exciting winding adapted to be energized from said exciting means, a pair of variable resistors, means for selectably connecting in circuit with said generator field exciting winding either of said variable resistors, each of said motors having a stabilizing field winding adapted to be energized by current from said generator.

15. In a skip hoist, in combination, winding drum means, a pair of motors for driving said winding drum means, a generator for supplying current to said motors, directional switch means for controlling the direction of current from said generator through said motors, switch means for connecting said motors in series relationship with each other or selectably connecting either motor in circuit alone, exciting means, each of said motors having a shunt field winding adapted to be excited by said exciting means, means for varying the strength of said shunt field windings, said generator having a field exciting winding adapted to be energized from said exciting means, a pair of variable resistors, means for selectably connecting in circuit with said generator field exciting winding either of said variable resistors, each of said motors having a stabilizing field winding adapted to be energized by current from said generator, said generator also having a series field winding.

16. In a skip hoist, in combination, winding drum means, motor means for driving said winding drum means, a generator for supplying current to said motor means, directional switch means for controlling the direction of current from said generator through said motor means, exciting means, said motor means being provided with shunt field winding means adapted to be energized by said exciting means, and variable resistor means in circuit with said shunt field winding means, said motor means having stabilizing field winding means adapted to be energized by current from said generator, said generator having a field exciting winding adapted to be energized from said exciting means.

17. In a skip hoist, in combination, winding drum means, motor means for driving said winding drum means, a generator for supplying current to said motor means, directional switch means for controlling the direction of current from said generator through said motor means, exciting means, said motor means being provided with shunt field winding means adapted to be energized by said exciting means, and variable resistor means in circuit with said shunt field winding means, said motor means having stabilizing field winding means adapted to be energized by current from said generator, said generator having a field exciting winding adapted to be energized from said exciting means, said generator having a series field winding.

18. In a skip hoist, in combination, winding drum means, motor means for driving said winding drum means, a generator for supplying current to said motor means, directional switch means for controlling the direction of current from said generator through said motor means, exciting means, said motor means being provided with shunt field winding means adapted to be energized by said exciting means, variable resistor means in circuit with said shunt field winding means, said motor means having stabilizing field winding means adapted to be energized by current from said generator, said generator having a field exciting winding adapted to be energized from said exciting means, and control means responsive to said motor means for modifying said variable resistor and for modifying the voltage developed by said generator.

19. In a skip hoist, in combination, winding drum means, motor means for driving said winding drum means, a generator for supplying current to said motor means, directional switch means for controlling the direction of current from said generator through said motor means, exciting means, said motor means being provided with shunt field winding means adapted to be energized by said exciting means, variable resistor means in circuit with said shunt field winding means, said motor means having stabilizing field winding means adapted to be energized by current from said generator, said generator having a field exciting winding adapted to be energized from said exciting means, said generator having a series field winding, and control means responsive to said motor means for modifying said variable resistor and for modifying the voltage developed by said generator.

20. In a skip hoist, in combination, winding drum means, a pair of motors for driving said winding drum means, a generator for supplying current to said motors, directional switch means for controlling the direction of current from said generator through said motors, switch means for connecting said motors in parallel relationship with each other or selectably connecting either motor in circuit alone, exciting means, each of said motors having a shunt field winding adapted to be excited by said exciting means, means for varying the strength of said shunt field windings, each of said motors having a stabilizing field winding adapted to be energized by current from said generator, said generator having a field exciting winding adapted to be energized from said exciting means, and a variable resistor for varying the strength of said generator field winding.

21. In a skip hoist, in combination, winding drum means, a pair of motors for driving said winding drum means, a generator for supplying current to said motors, directional switch means for controlling the direction of current from said generator through said motors, switch means for connecting said motors in parallel relationship with each other or selectably connecting either motor in circuit alone, exciting means, each of said motors having a shunt field winding adapted to be excited by said exciting means, means for varying the strength of said shunt field windings, each of said motors having a stabilizing field winding adapted to be energized by current from said generator, said generator having a field exciting winding adapted to be energized from said exciting means, and a variable resistor for varying the strength of said generator field winding, said generator also having a series field winding.

22. In a skip hoist, in combination, winding drum means, motor means for driving said winding drum means, a generator for supplying current to said motor means, exciting means, said generator having a field exciting winding adapted to be energized from said exciting means, said motor means being provided with field winding means adapted to be energized by said exciting means, variable resistor means in circuit with said generator field exciting winding, other variable resistor means in circuit with said motor field winding means, and control means responsive to said winding drum means for controlling both of said variable resistor means in sequence to vary the speed of said winding drum means.

23. Drive means for a hoist comprising a pair of motors, means for connecting the armatures of said motors in parallel, a generator for supplying current to said motors, exciting means, each of said motors having a shunt field winding adapted to be energized by said exciting means, said generator having a field winding adapted to be excited by said exciting means, each of said motors having a stabilizing field winding adapted to be excited by current from said generator, means for varying the speed of said motors by variation of the voltage of said generator, and means for controlling the direction of rotation of said motors by reversing the connections to the armatures of said motors.

GORDON FOX.